Dec. 17, 1968  J. F. BLUMENFELD ET AL  3,417,187
ELECTRODE HOLDER FOR GLASS FURNACES OR THE LIKE
Filed Dec. 5, 1966  3 Sheets-Sheet 1

INVENTOR.
JOHN F. BLUMENFELD
GEORGE F. HANKS
BY
McCormick, Paulding & Huber
ATTORNEYS.

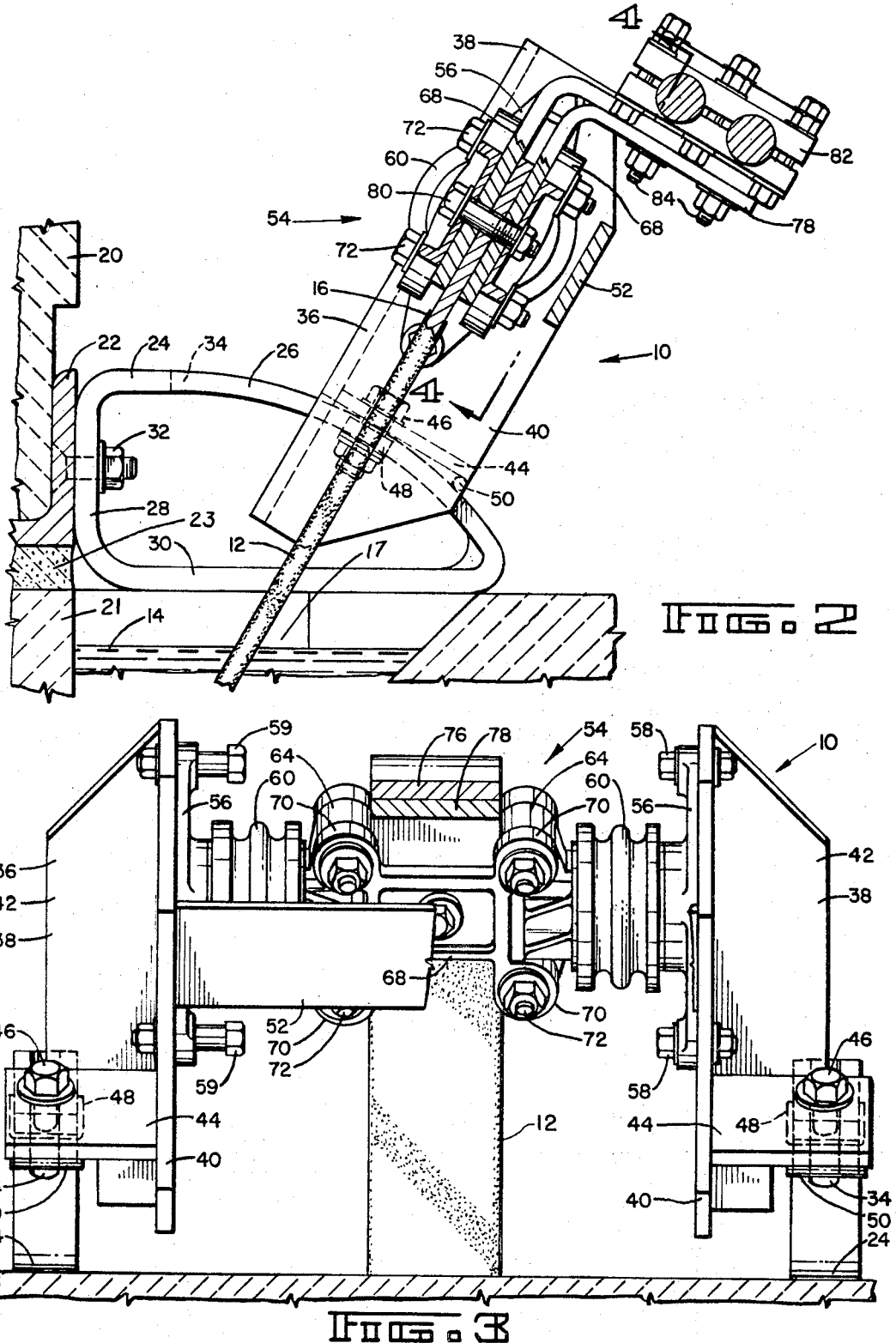

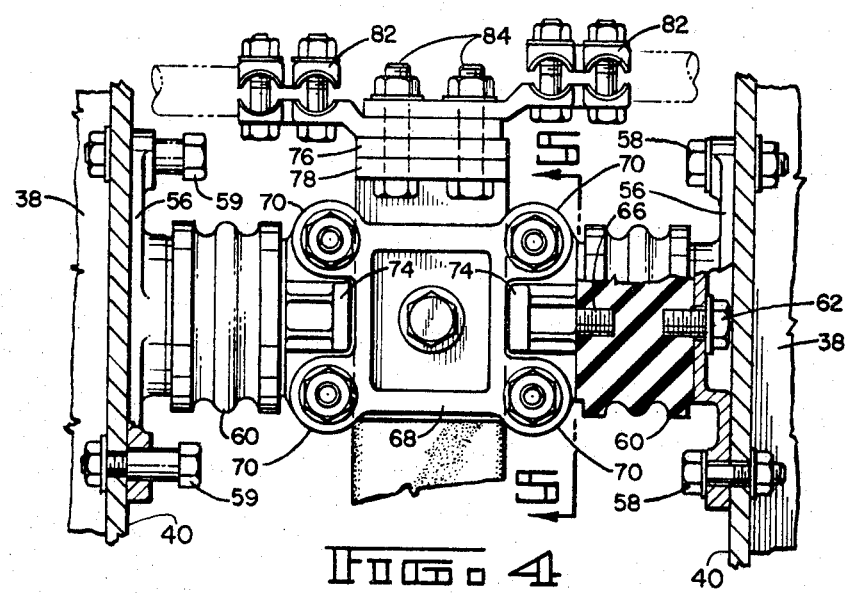
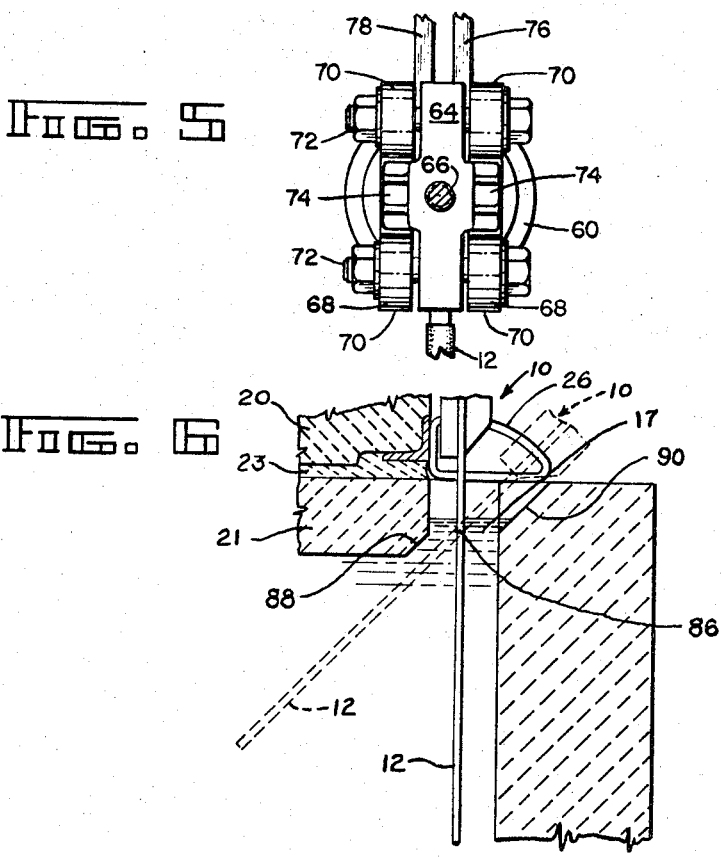

United States Patent Office 3,417,187
Patented Dec. 17, 1968

3,417,187
ELECTRODE HOLDER FOR GLASS FURNACES OR THE LIKE
John F. Blumenfeld, Simsbury, and George F. Hanks, Avon, Conn., assignors to Emhart Corporation, Bloomfield, Conn., a corporation of Connecticut
Filed Dec. 5, 1966, Ser. No. 599,088
16 Claims. (Cl. 13—6)

ABSTRACT OF THE DISCLOSURE

An electrode holder for use with an electrode inserted through the top surface of a body of material contained in a glass melting furnace or the like consists of a base, adapted to be fixed to the furnace above the top level of the material, and an electrode carrying frame connected with the base for angularly adjustable movement about a virtual pivot axis located a substantial distance below the base and possibly within the body of material. The parts which actually engage the electrode are supported by and electrically insulated from the frame by load carrying electrical insulators connected between the frame and the electrode engaging parts in such a manner as to allow for thermal expansion and contraction of the insulators.

---

This invention relates to furnaces, such as glass making furnaces, wherein a body of material is heated entirely or in part by means of electric currents passed between two or more electrodes inserted into the material, and deals more particularly with a holder for supporting such an electrode.

Electrodes used for electrically heating the material contained in a furnace for making glass or the like may either be inserted through the side walls or bottom of the furnace or may be inserted into the material by being suspended above the material so as to project downwardly through the top surface thereof. This latter possibility, at least in the case of glass making furnaces, is normally restricted to open top furnace tanks which are completely covered by an insulating layer of batch material or to closed top furnace tanks having side wall bays or other special provisions for accommodating electrodes the holders for which are located outside of the furnace. This restriction is due to the fact that practical electrode holders cannot be constructed to withstand the intense heat generated within a closed top furnace.

A closed top furnace including side wall bays for accommodating electrodes inserted substantially vertically into a body of molten glass contained in the furnace tank is shown in co-pending application, Ser. No. 396,148, entitled, Glass Melting Furnace, by Aaron K. Lyle, filed Sept. 14, 1964. The drawings of this application show an electrode holder as applied to a furnace similar to the one shown in said co-pending application and reference may be made thereto for further details of an exemplary furnace construction to which the electrode holder of this invention may be applied. It should be noted, however, that in such a furnace the sidewall bays are preferably constructed so as to expose a minimum amount of molten material, thereby minimizing the amount of heat radiated therefrom.

The general object of this invention is to provide an electrode holder for an electric glass melting furnace or the like for use in connection with an electrode inserted substantially vertically through the top surface of the glass or other material contained in the furnace.

Another object of this invention is to provide an electrode holder particularly well adapted for use with a closed top furnace having side wall bays for receiving electrodes.

Another object of this invention is to provide an electrode holder of the foregoing character which is readily adjustable to vary the angle at which the associated electrode enters the material being heated. In keeping with this object, a more particular object is to provide an electrode holder which allows the angle of the electrode to be varied through a wide range of angles while the electrode is located in a furnace side wall bay providing a relatively small exposed area of molten material through which the electrode is inserted.

Still another object of this invention is to provide an electrode holder of the foregoing character which is of a simple, rugged and economical construction.

Other objects and advantages of the invention will be apparent from the following description and from the drawings forming a part hereof.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 2 is a vertical sectional view taken on the line 2—2 of FIG. 1.

FIG. 3 is a vertical sectional view taken on the line 3—3 of FIG. 1, part of the movable frame being shown broken away to reveal the construction of the electrode support assembly.

FIG. 4 is a fragmentary inclined sectional view taken on the line 4—4 of FIG. 2.

FIG. 5 is a fragmentary sectional view taken on the line 5—5 of FIG. 4.

FIG. 6 is a reduced scale, somewhat schematic, vertical sectional view taken generally on the line 2—2 of FIG. 1 showing the angular range of movement of the electrode.

Figure 1:
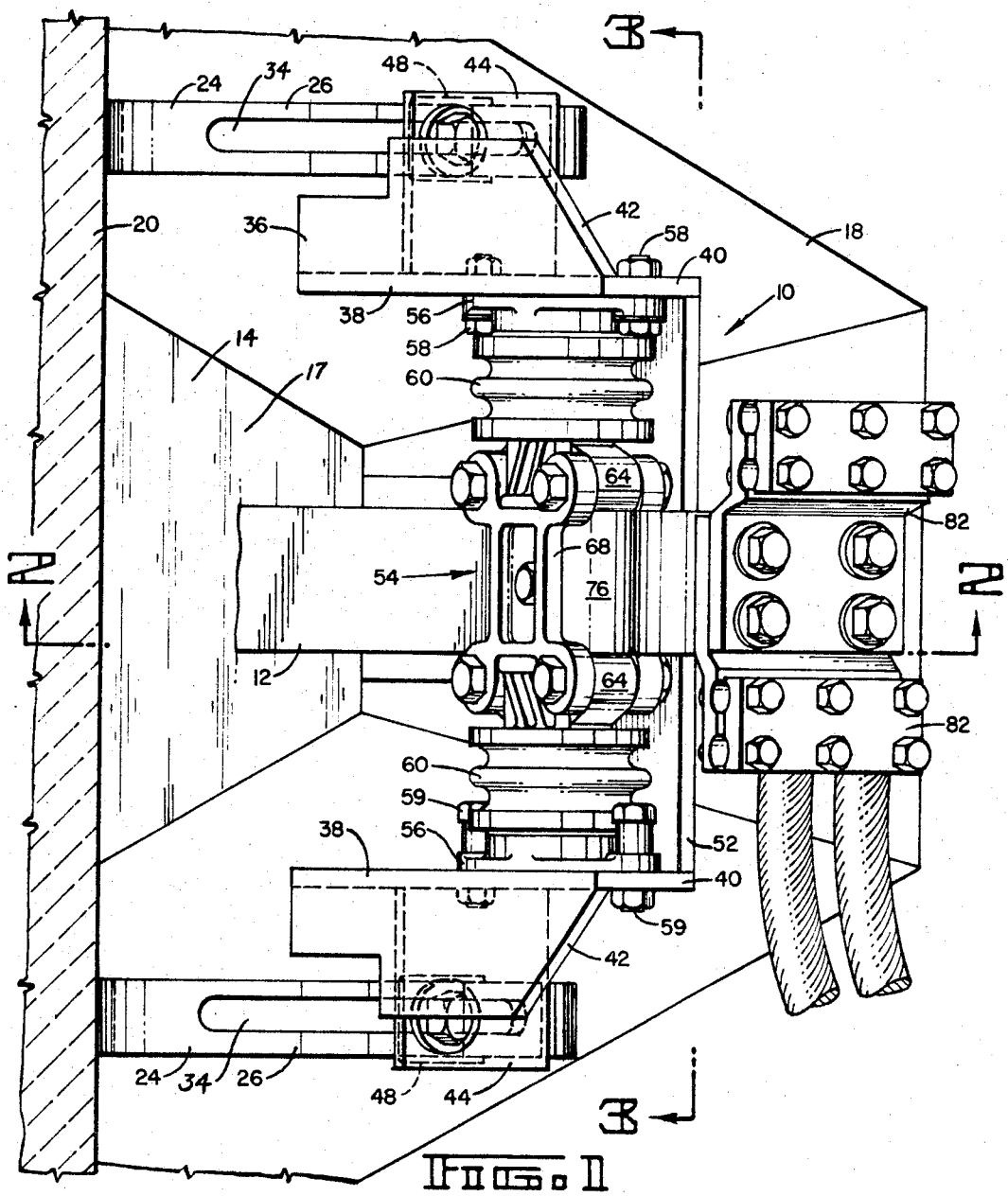
FIG. 1 is a plan view of an electrode holder embodying the invention.

Turning now to the drawings, the illustrated electrode holder is designed for use with an electrode made from a flat bar of material having a generally rectangular cross section. Some advantages are achieved by using a flat bar as an electrode and therefore such electrodes are presently preferred. The rate at which the electrode wears (or is consumed) is, among other things, dependent on the density of the electric current at the surface of the electrode, and a flat bar electrode presents more surface area per pound of electrode material than other common shapes, such as round or square rods. Nevertheless, the electrode holder of this invention is not necessarily limited to use with a flat bar electrode and by simple changes may be altered to accommodate electrodes of other cross sectional shapes without departing from the invention.

Considering first FIGS. 1, 2 and 3, these figures show an electrode holder 10 attached to a furnace and adapted for use with an electrode 12 made of a flat bar of material of generally rectangular cross-section. The electrode 12 is held by the holder 10 so as to extend generally downwardly therefrom into a body of molten glass or other material indicated at 14 in FIG. 2. The electrode is preferably made from molybdenum and covered over a portion of its length with a suitable protective coating bonded to its outer surface to retard oxidation of the electrode material by its exposure to air at the elevated temperatures involved. This coating is indicated at 16 in FIG. 2 and extends from a point located some distance below the surface of the body of material 14 up to a point immediately below the point at which the electrode is connected with the holder.

In the illustrated case the furnace includes a tank for containing the body of material 14 and the electrode is inserted into the material through a side wall bay 18 forming part of the side wall of the tank, the bay extending laterally outwardly from the main portion of the side wall and exposing a small portion of the material 14 to the atmosphere outside of the furnace. The tank is closed by a roof, a portion of a side wall of which is indicated at 20 in FIG. 2, supported in part by an angle member 22 extending along the length of the furnace. The side wall bay 18 is formed from a number of refractory blocks and has an upwardly facing surface on which part of the holder 10 rests as hereinafter described. In line with the roof side wall 20, the side wall bay 18 also includes a mantel block 21 which extends across the throat of the bay and which protrudes some distance downwardly into the body of material 14 to prevent the heated gases in the furnace from escaping in the space between the surface of the material 14 and the bottom of the roof side wall 20, the space between the mantel block and the roof side wall being sealed with a refractory cement or other similar packing material 23 after the furnace is started up.

The holder 10 includes a fixed base formed by two stationary guides 24, 24 which, as shown in FIGS. 1 and 3, are spaced relative to each other along the length of the furnace and are located on opposite sides of the throat 17 of the associated side wall bay 18. Each stationary guide, as viewed in FIG. 2, has an open generally three-sided shape, being made up of a generally arcuately curved elongated section 26, a vertical section 28 and a horizontal section 30, the three sections being integral with one another and the horizontal section 30 being located below the curved section 26. The stationary guides 24, 24 are preferably made from cast steel and the vertical section 28 of each one is provided with an opening for receiving a fastener 32 for fixing it to the angle member 22 or other similar furnace structure. The horizontal section 30 of each guide rests on the upper surface of the associated side wall bay 18. As shown best in FIGS. 1 and 2 the curved section 26 of each guide 24 includes a slot 34 extending along a major portion of its length.

The electrode holder 10 further includes a movable frame 36 which is adjustably fixed to the two curved sections 26, 26 of the two stationary guides 24, 24 and which is movable to different positions along the length of the curved sections 26, 26 to vary the angular orientation of the movable frame relative to the body of material 14 and to accordingly adjust the angle at which the electrode 12 enters the material 14. The movable frame 36 includes two side portions each consisting predominately of an angle member 38, the two angle members 38, 38 being located so that two legs 40, 40 thereof are located in spaced parallel planes and so that the two other legs 42, 42 thereof are located in a common plane with each extending laterally outwardly from the associated leg 40. Welded to the legs 40 and 42 of each angle member 38 is a bearing plate 44 which engages the upper surface of the curved section 26 of the associated stationary guide 24. The means for adjustably fixing the movable frame to the two guides 24, 24 comprise two bolts 46, 46 each passing through a respective one of the bearing plates 44, 44 and through the slot 34 of the associated guide. Received on each bolt 46 and located below the curved section of the associated guide is a U-shaped slide 48, the nut for the bolt 46 being welded to the slide 48 so that the bolt 46 may be loosened or tightened by means of a single wrench. Each bearing plate 44 has a flat downwardly facing surface which engages the curved upwardly facing surface of the associated guide and a spacer bar 50 is welded to the plate 44 to provide two points of contact with the guide. The movable frame 36 further includes a transversely extending part or brace 52 for establishing and maintaining the spacing between the two angle members 38, 38, the part 52 being welded to the two angle members at its opposite ends.

An electrode supporting assembly, indicated generally at 54, is located between the two parallel legs 40, 40 of the angle members 38, 38 and directly engages and supports the electrode 12. The electrode support assembly is in turn supported by and electrically insulated from the two angle members by means including an insulator means interposed between each leg 40 and the assembly. As shown best in FIG. 4, the connecting means associated with each side leg 40 includes an insulator support base 56 attached to the associated leg 40. As shown in FIGS. 1, 3 and 4 one of the support bases 56, 56 is fixed to its associated leg 40 by two bolts 58, 58 passing through the two openings therein, and the other base 56 is attached to its associated leg 40 by two shouldered bolts 59, 59 which pass loosely through the two openings therein so that the base may move transversely of the associated leg 40 while nevertheless being restrained against rotation. This allows for thermal expansion and contraction of the insulators and other parts located between the legs 40, 40. Each insulator support base includes a central portion providing a seat for one end of an associated generally cylindrical ceramic insulator 60 which is fixed to the base by means of a screw 62 passing through the mounting base and threadably engaged with a threaded opening in the insulator. At its other end each insulator 60 is fixed to a connector member 64 having a seat engageable with the associated end face of the insulator and having a threaded stud 66 threadably received in a threaded opening in the insulator, the stud serving to fix the insulator to the connector.

The two connector members 64, 64 comprise part of the electrode support assembly 54. This assembly further includes two clamping members 68, 68 which are arranged so as to be located on opposite sides of the electrode 12 when the electrode is in place in the holder as shown. The two clamping members 68, 68 are identical to one another and each, as best seen in FIGS. 3 and 4, include four apertured ears 70, 70 which extend laterally outwardly beyond the adjacent sides of the electrode 12, two of the ears being located on one side of the electrode and the other two ears being located on the other side of the electrode. The two clamping members are held in assembly with one another and are drawn tightly toward the electrode 12 by four bolts 72, 72 passing through the four sets of ears 70, 70. As shown in FIGS. 4 and 5, the two ears 70, 70 on each side of the electrode 12 are spaced from one another along the length of the electrode and receive therebetween an outwardly projecting flange 74 on the associated connector member 64, the flange 74 being engageable with the associated clamping member to aid in positioning the connector member relative thereto and there being two flanges 74, 74 on each connector member 64 each associated with a respective one of the clamping members 64, 64. Each connecting member 64 further includes portions extending between the two associated sets of ears 70, 70 and has openings which receive the two associated bolts 72, 72 so that the bolts 72, 72 in addition to holding the two clamping members 68, 68 in tight assembly with the electrode also hold the two connector members 64, 64 in place.

The electrode support assembly 54 also includes two L-shaped bus bars 76 and 78 located between the clamping members 68, 68 and on opposite sides of the electrode 12. The two bus bars 76 and 78 have flat surfaces which directly engage the flat surfaces of the electrode adjacent the top end thereof, and preferably these bus bars are plated with silver to enhance their electrical contact with the electrode. A bolt 80 passes through the two clamping members 68, 68, the two bus bars 76 and 78, and the electrode 12 to aid the bolts 72, 72 in clamping the clamping members, bus bars and electrode in tight assembly and to also provide a positive restraint against movement of the electrode from the holder. The outer arms of the bus bars 76 and 78 flatly engage one another as shown in FIGS. 2 and 4 and receive two terminals 82, 82 fixed to the bus bars by bolts 84, 84, the terminals 82, 82 being adapted for connection to electric supply cables for supplying electric power to the electrode through the bus bars.

By means of the construction and arrangement of the holder 10 a limited amount of heat is transmitted to it either by conduction or radiation, and the construction is further such that differences in thermal expansion or contraction of the parts are accommodated without imposing undue stresses on the parts, particularly the ceramic insulators. It is also possible, but not necessary, to provide a cover for the exposed material in the bay, thereby reducing heat losses and preventing exposure of the electrode holder to radiation from the hot surface of the material. The holder may, if desired, be similarly protected by the use of a metal heat reflecting shield located between it and the surface of the material.

Having now described the construction of the holder 10, its use in adjusting the angular position of an electrode 12 may be considered by reference to FIG. 6. In this figure the solid lines show the holder 10 and electrode 12 in one limit of their range of movement at which the electrode is in a substantially vertical position. The broken lines show the same parts in the other limit of their range of movement, and in this position the electrode is arranged at a substantial angle to the vertical so that the inner end thereof is located substantially closer to the opposite side wall (not shown) of the furnace, and farther from the bottom of the furnace, than in the first position. The curved sections 26, 26 of the stationary guides 24, 24, only one of which is shown in FIG. 6, are so arranged that each has an approximate center of curvature at a point, indicated at 86, located a substantial distance below the guide and within the throat 17 of the bay. Preferably, the curvature of the sections 26, 26 is such that the point 86 is located below the surface of the molten material 14 and above, or at least close to, the bottom of the mantel block 21. The parts of the holder 10 are further so arranged that the electrode 12 is held so as to pass through or very close to the point 86, as shown.

The point 86 is the point or axis about which the holder 10 and electrode 12 pivot as the holder is moved to various positions of adjustment along the curved sections of the guides. Since this pivot axis is located in the throat of the side wall bay the throat may be kept a relatively small size because the portions of the electrode located in the throat undergo relatively small displacements as the holder and the electrode are moved between the limits of their movement and because no supporting parts are located at the pivot point. The corners of the mantel block 21 and of the outer block of the side wall bay are also preferably relieved or beveled, as shown at 88 and 90, respectively, in FIG. 6, to permit maximum movement of the electrode from its vertical position while maintaining a minimum size of throat and accordingly a minimum area of molten material exposed to the atmosphere.

The invention claimed is:

1. The combination with a furnace containing a body of material to be heated, of an electrode inserted through the top surface of said body of material, and a device for supporting said electrode, said device comprising a stationary base fixed relative to said furnace above the top surface of said body of material, a frame connected with said base for movement relative thereto about a horizontal axis which is located a substantial distance below said base, means for holding said electrode in a fixed position relative to said frame, and means for releasably holding said frame in different positions of angular adjustment relative to said base about said axis.

2. The combination defined in claim 1 further characterized by said electrode being of such a length and so positioned relative to said frame as to pass approximately through and beyond said pivot axis.

3. A combination defined in claim 1 further characterized by said axis being located below the top surface of said body of material contained in said furnace.

4. The combination defined in claim 1 further characterized by coengaging surfaces on said base and on said frame, at least one of said surfaces being generally arcuately curved about said pivot axis and the other of said surfaces being slidable thereover about said pivot axis to provide said relative movement between said base and said frame.

5. The combination defined in claim 1 further characterized by said stationary base comprising two generally similar horizontally spaced guides, said frame extending between and supported by said two guides, and said electrode being arranged so as to extend downwardly from said frame between said two guides.

6. The combination defined in claim 1 further characterized by said furnace having a main body and a laterally outwardly projecting side wall bay and a mantel block extending across the top of said bay and projecting some distance above and below the upper surface of the material in said furnace to separate the surface of the material in said side wall bay from the surface of the material in said main body of said furnace, said stationary base being located immediately above said bay and said axis being located between the top surface of the material contained in said side wall bay and the bottom surface of said mantel bolck.

7. The combination defined in claim 6 further characterized by said axis being located at approximately the same level as the bottom surface of said mantel block.

8. A device for supporting an electrode inserted through the top surface of a body of material contained in a furnace, said device comprising a stationary base for fixed attachment to a furnace such as aforesaid, a frame supported by said base, said base including two stationary spaced guides each having a generally arcuately curved guide surface, said frame including two side portions each engaging the arcuate guide surface of a respective one of said two stationary guides and movable relative thereto to change the angular orientation of said frame relative to said base, an electrode support assembly for receiving and holding an electrode which support assembly is located between and in spaced relation to said side portions of said frame, a common means for both supporting said electrode support assembly from said frame and for electrically insulating it from said frame, said latter means including two electrical insulators each located and connected between a respective one of said two side portions of said movable frame and said electrode support assembly, and means for selectively fixing said frame relative to said base at any one of a plurality of possible positions of adjustment along said arcuately curved guide surfaces.

9. A device for supporting an electrode as defined in claim 8 further characterized by each of said two stationary guides including a generally arcuately curved elongated section having an upper surface defining said arcuately curved guide surface, each of said side portions of said movable frame including a generally downwardly facing surface engageable with the arcuate surface of the associated stationary guide, said generally arcuately curved elongated section of each of said stationary guides including a slot passing therethrough and extending along a substantial portion of its length, said said means for selectively fixing said frame to said base including a threaded fastener passing through each of said slots and connected to the associated one of said frame side portions.

10. A device for supporting an electrode as defined in claim 8 further characterized by each of said two stationary guides having an open and generally three-sided shape, one side of which is defined by a generally arcuately curved elongated section which provides said generally arcuately curved surface and the other two sides of which are defined by a substantially straight vertical section and a substantially straight horizontal section, said horizontal section being located below said arcuately curved section so as to be capable of resting on the upwardly facing top surface of a furnace wall.

11. A device for supporting an electrode inserted through the top surface of a body of material contained in a furnace, said device comprising a frame including two spaced side portions, an electrode support assembly located directly between said two side portions of said frame and spaced from both of said side portions, and a common means for both supporting said electrode support assembly from said frame and for electrically insulating it therefrom, said common support and insulating means including two electrical insulators each located between a respective one of said frame side portions and said electrode support assembly, means connecting one end of each of said insulators to its associated frame side portion, and means connecting the other end of each of said insulators to said electrode support assembly.

12. A device for supporting an electrode as defined in claim 11 further characterized by each of said insulators comprising a single body of electrical insulating material, said means for connecting one end of each of said insulators to the associated side portion of said frame including a threaded fastener threadably engaging a threaded opening at one end of the insulator, and said means for connecting said other end of each of said insulators to said electrode support assembly including a threaded fastener threadably engaging a threaded opening at the other end of said insulator.

13. A device for supporting an electrode as defined in claim 12 further characterized by said electrode support assembly including two clamping members arranged so as to be located on opposite sides of an electrode received therebetween and each being of such size and shape as to extend on both sides thereof laterally beyond such electrode, two fasteners passing through said two clamping members and arranged so that each is located adjacent a respective side of an electrode received between said clamping members, two connector members each positioned between said two clamping members and having an opening therein through which an associated one of said latter fasteners passes to hold said connector member in place relative to said two clamping members, and said threaded fasteners which threadably engage threaded openings in said other ends of said two insulators each comprising a stud fixed to an associated one of said connector members.

14. A device for supporting an electrode as defined in claim 13 further characterized by two bus bars located between said two clamping members and adapted to engage an electrode located therebetween, said two bus bars extending outwardly beyond said two clamping members, and an electrical terminal fixed to said outwardly extending portions of said bus bars for connection with an electric supply cable.

15. A device for supporting an electrode as defined in claim 11 further characterized by said frame including a part extending transversely between said two side portions thereof to establish and maintain the spacing between said two side portions, and said means for connecting one end of at least one of said insulators to the associated side portion of said frame comprising a sliding connection permitting said one end of said insulator to move transversely of said associated side portion and restraining said one end of said insulator against rotation relative to said associated side portion.

16. A device for supporting an electrode as defined in claim 11 further characterized by said frame including a part extending transversely between said two side portions thereof to establish and maintain the spacing between said two side portions, said means for connecting each of said insulators to the associated side portions of said frame comprising an insulator support base fixed to said insulator and having at least two openings passing therethrough transversely of the associated side portion, and one of said means for connecting one of said insulators to its associated side portion including two transversely extending parts fixed to said associated side portion and passing loosely through said two openings in said support base so as to permit said support base to move transversely relative to its associated side portion while nevertheless restraining said support base against rotation relative to said associated side portion.

References Cited

UNITED STATES PATENTS

| 1,928,289 | 9/1933 | Henry et al. | 13—6 |
| 2,131,599 | 9/1938 | Shrum | 65—5 |
| 2,903,565 | 9/1959 | Launder et al. | 219—124 |

BERNARD A. GILHEANY, *Primary Examiner.*

H. B. GILSON, *Assistant Examiner.*

U.S. Cl. X.R.

13—15